US007958438B2

(12) United States Patent
Uemura et al.

(10) Patent No.: US 7,958,438 B2
(45) Date of Patent: Jun. 7, 2011

(54) CAN SYSTEM

(75) Inventors: Toshiyuki Uemura, Hyogo (JP); Yasuyuki Inoue, Hyogo (JP)

(73) Assignee: Renesas Electronics Corporation, Kanagawa (JP)

(*) Notice: Subject to any disclaimer, the term of this patent is extended or adjusted under 35 U.S.C. 154(b) by 338 days.

(21) Appl. No.: 12/076,980

(22) Filed: Mar. 26, 2008

(65) Prior Publication Data
US 2008/0183835 A1 Jul. 31, 2008

Related U.S. Application Data

(63) Continuation of application No. 11/261,522, filed on Oct. 31, 2005, now Pat. No. 7,373,577.

(30) Foreign Application Priority Data

Nov. 5, 2004 (JP) .................................. 2004-321797

(51) Int. Cl.
*G08C 25/00* (2006.01)
(52) U.S. Cl. ............ 714/799; 714/703; 714/25; 714/30; 714/48; 714/709; 714/716; 714/717; 714/746; 709/201; 370/241; 370/249
(58) Field of Classification Search .................. None
See application file for complete search history.

(56) References Cited

U.S. PATENT DOCUMENTS

| 4,669,081 A | 5/1987 | Mathewes et al. |
| 4,999,837 A * | 3/1991 | Reynolds et al. ............. 714/703 |
| 5,363,379 A | 11/1994 | Eckenrode et al. |
| 5,958,029 A | 9/1999 | McKinnon |
| 6,487,686 B1 | 11/2002 | Yamazaki et al. |
| 6,560,720 B1 | 5/2003 | Chirashnya et al. |
| 6,625,764 B1 | 9/2003 | Dawson |
| 6,886,116 B1 | 4/2005 | MacLellan et al. |
| 7,016,430 B1 | 3/2006 | Grivna et al. |
| 7,020,810 B2 | 3/2006 | Holman |
| 7,020,811 B2 | 3/2006 | Byrd |
| 7,340,539 B2 * | 3/2008 | Barrenscheen et al. .......... 710/6 |
| 7,349,479 B2 * | 3/2008 | Suganuma et al. ........... 375/257 |
| 2002/0144038 A1 * | 10/2002 | Smith ........................... 710/240 |

FOREIGN PATENT DOCUMENTS

| JP | 62-088047 | | 4/1987 |
| JP | 63-281539 | | 11/1988 |
| JP | 2002-073430 | * | 3/2002 |
| JP | 2002-074340 | | 3/2002 |
| JP | 2003-229875 | * | 8/2003 |
| JP | 2003-244779 | | 8/2003 |
| JP | 2004-320565 | | 11/2004 |

OTHER PUBLICATIONS

Japanese Office Action, w/English translation thereof, issued in Japanese. Patent Application No. JP 2004-321797 dated Aug. 31, 2010.*

(Continued)

*Primary Examiner* — John P Trimmings
(74) *Attorney, Agent, or Firm* — McDermott Will & Emery LLP

(57) ABSTRACT

Provided is a CAN system that can generate an error signal without requiring hardware for generating an error signal to be connected to a bus. A protocol processing part within a CAN controller incorporates error data into receive data or send data, based on error data information stored in a register.

3 Claims, 13 Drawing Sheets

OTHER PUBLICATIONS

ISO/WD11898-1; "Road Vehicles—Interchange of Digital Information—Part 1: Controller Area Network Data Link Layer and Medium Access Control"; pp. 1-48; c. 1999.

Barranco et al., "CANnentrate: An active star topology for CAN networks", Sep. 2004, IEEE Workshop on factory communications, pp. 219-228.

Shigeo Uno, "Basic Knowledge of CAN", transistor technology, CQ Publication Company, 2003, vol. 40, pp. 181-201.

Japanese Office Action, with English translation, issued in Japanese Patent Application No. JP 2004-321797, dated Jun. 3, 2010.

Japanese Office Action, w/English translation thereof, issued in Japanese Patent Application No. JP 2004-321797 dated Aug. 31, 2010.

United States Office Action issued in U.S. Appl. No. 12/846,404 dated Dec. 27, 2010.

* cited by examiner

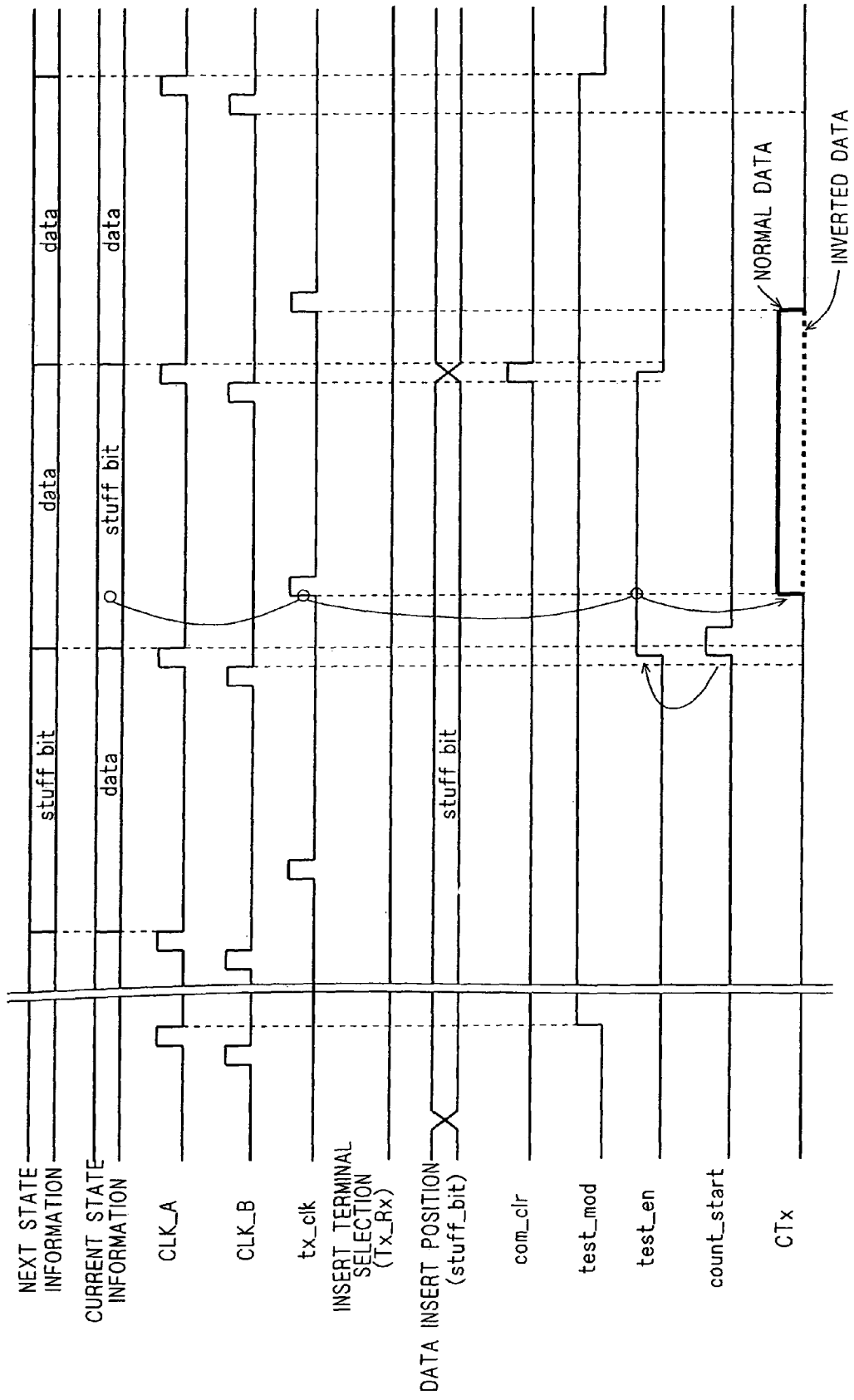

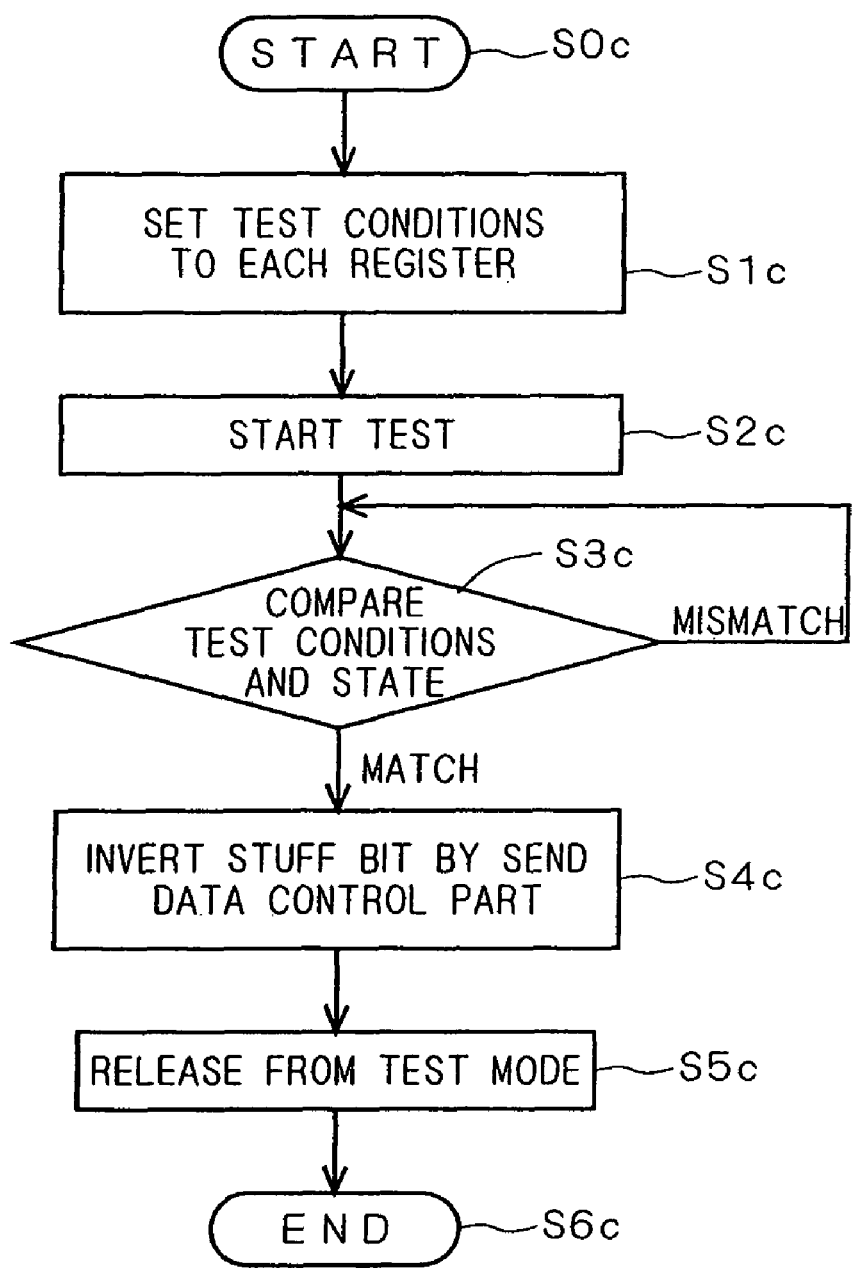

CAN SYSTEM

RELATED APPLICATIONS

This application is a Continuation of U.S. application Ser. No. 11/261,522, filed Oct. 31, 2005 now U.S. Pat. No. 7,373,577, claiming priority of Japanese Application No. 2004-321797, filed Nov. 5, 2004, the entire contents of each of which are hereby incorporated by reference.

BACKGROUND OF THE INVENTION

1. Field of the Invention

The present invention relates to a controller area network (CAN) system that controls send/receive among a plurality of electric control units located within a vehicle and the like. In particular, the invention relates to a CAN system that facilitates evaluation of communication quality.

2. Description of the Background Art

In the recent years, a variety of electric control units (ECUs) are located within vehicles and medical equipments. The send/receive of information between the units is controlled by a CAN system that is one of local area networks (LANs).

It should be the first priority to secure operational safety in the vehicles and medical equipments. Therefore the CAN system focuses on correcting of errors and protection against occurrence of errors, and it is paramount important to secure communication quality between the units.

For example, Japanese Patent Application Publication Laid-Open Nos. 2003-244779 and 2003-229875 disclose art in relation to this application.

There are the following problems in conventional CAN systems in time of evaluating communication quality.

Specifically, in evaluation of communication quality as to whether individual ECUs within a CAN system can recognize error data, it is necessary to purposely generate error data on a communication bus within the CAN system. The occurrence of this error data can be achieved by connecting, to the communication bus, hardware that can generate reproducible interference on the communication bus. Specific examples of such hardware are Vector-manufactured "CANstressD" and "CANstressDR."

However, the communication quality evaluation using such hardware may fail to accurately generate error data at an assumed position in a communication signal. For example, although ISO11898 (so-called CAN-class C) specifies communication rates from 125 kbps (kilo-bit per second) to 1 Mbps (mega-bit per second), the above-mentioned hardware complies with only communication rates of up to 125 kbps in order to prevent delays in the insert timing of error data, and it does not comply with the highest communication rate of 1 Mbps. It is therefore impossible for the communication quality evaluation using the above hardware to perform accurate error data generation and communication quality evaluation in case of operations at a communication rate of 1 Mbps.

There is also a problem in starting a self-diagnostic program.

For a vehicle employing a CAN system, in general, a fixed storage unit within a microcomputer is often equipped with a self-diagnostic program. This is for the purpose of detecting any abnormal operation in the event that, due to prolonged use, a vehicle-borne semiconductor device deteriorates to cause a poor operation.

A self-diagnostic program generally employs a loop back mode that receives sent communication data for itself. Since the loop back mode assumes communication in which send/receive is carried out normally, it is possible to check circuit defects in normal communication. However, the loop back mode does not assume communication containing error data, and it is therefore impossible to evaluate communication containing error data. Hence, it is impossible to check whether a circuit for error detection processing (i.e., error management circuit) itself has a defect.

SUMMARY OF THE INVENTION

It is an object of the present invention to provide a CAN system that can generate error data without requiring hardware for error data generation to be disposed externally of a CAN bus, and a CAN system that can evaluate communication containing error data even in a loop back mode.

According to an aspect of the present invention, a controller area network (CAN) system has a CAN bus, and a plurality of electric control units (ECUs) respectively connected to the CAN bus. At least one of the plurality of ECUs has a protocol processing part, a register, a message processing part, and an error management circuit. The protocol processing part performs data format interpretation processing of receive data according to a CAN protocol, and performs data format preparation processing of send data according to a CAN protocol. The register stores error data information on the attribute of error data. The message processing part can retain receive message data contained in the receive data and send message data to be contained in the send data. The error management circuit can detect whether the receive data contains error data. The protocol processing part incorporates the error data into the receive data or the send data, based on the error data information.

The protocol processing part incorporates error data into receive data or send data, based on error data information, so that error data can be incorporated into the receive data in the interior of the ECU. This requires no hardware for error data generation that is disposed externally of the CAN bus. For example, ISO11898 provides accurate error data generation and communication quality evaluation at the highest communication rate of 1 Mbps. Since error data can be incorporated into send data in the interior of the ECU, communication containing error data can be carried out in a loop back mode. Therefore, testing as to whether the error management circuit can perform accurate error detection in the loop back mode makes it possible to check whether the error management circuit itself has a defect.

These and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a timing chart when an inverted stuff bit is again inverted to obtain error data during stuff bit mode; and FIG. 13 is a flow chart when a stuff bit is converted to error data.

DESCRIPTION OF THE PREFERRED EMBODIMENTS

1. First Preferred Embodiment

This invention is a CAN system that has, at a CAN controller within an ECU, a protocol processing part and a register for storing error data information on the attribute of error data, wherein the protocol processing part can incorporate error data into receive data or send data, based on the error data information.

Figure 1:
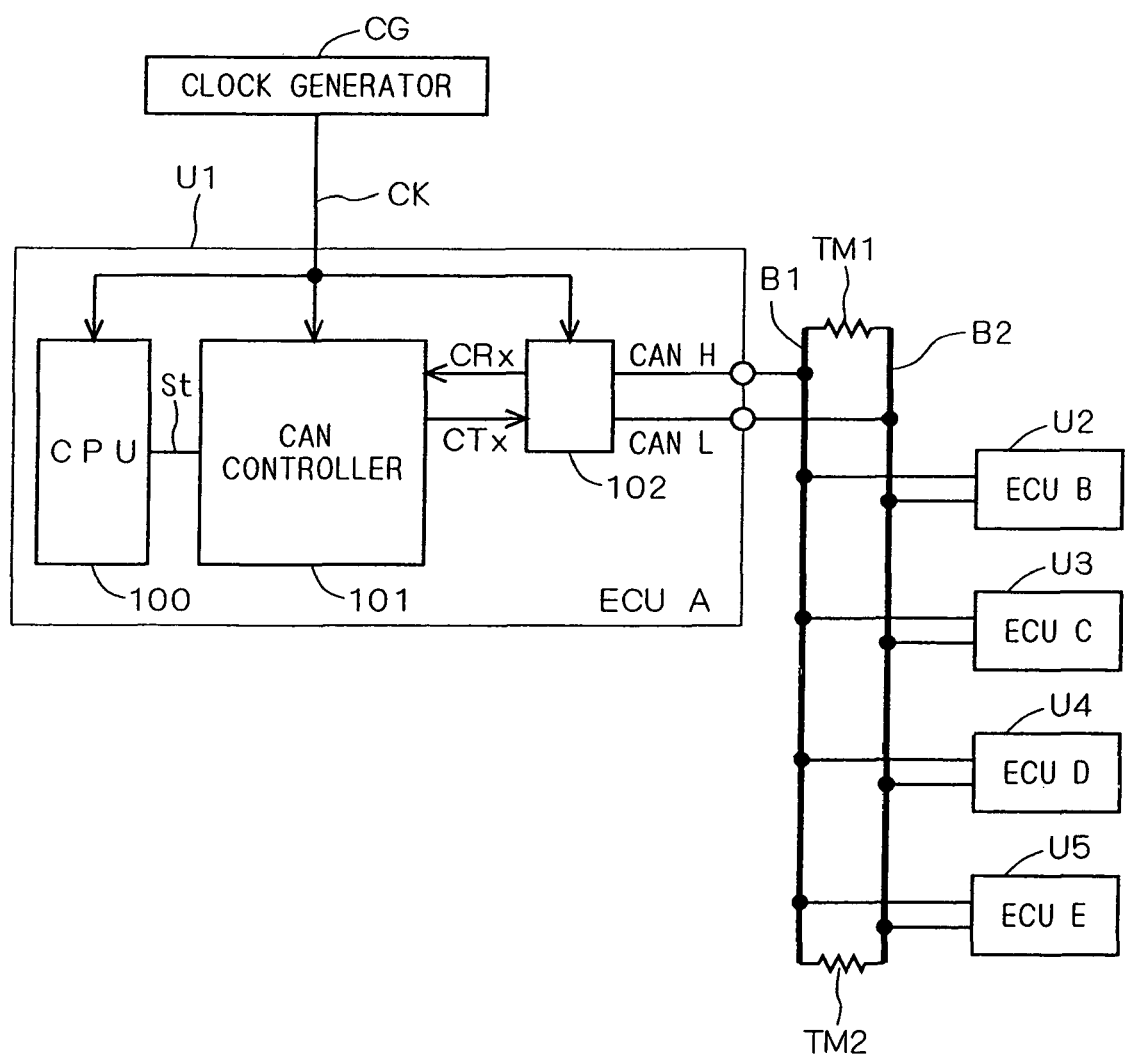
FIG. 1 is a diagram showing a configuration of a CAN system according to the present invention.

FIG. 1 is a diagram showing the configuration of a CAN system according to the invention. This CAN system has buses for CAN (hereinafter referred to as CAN buses) B1 and B2, a plurality of electric control units (ECUs) U1 to U5 connected to the CAN buses B1 and B2, respectively, and clock generators CG that are located for each of the units U1 to U5, and supply an operation clock CK to the corresponding unit (only one corresponding to the unit U1 is shown in FIG. 1).

For example, the units U1 to U5 are for example an anti-lock brake system (ABS) control unit, a gearbox control unit, an electronic control fuel injection unit, and the like. Although only the five units of U1 to U5 are shown here, of course, more units may be contained in this CAN system.

There are the two CAN buses B1 and B2, and the potential difference between the two becomes a signal value of send data from the electric control units U1 to U5, and a signal value of receive data at the electric control units U1 to U5. The both ends of the CAN buses B1 and B2 are connected to each other with terminating resistances TM1 and TM2, respectively.

Since the individual units U1 to U5 have the same configuration, the internal configuration of each unit will be described taking the unit U1 as example.

The unit U1 has a local central processing unit (CPU) 100, a CAN controller 101, and a transceiver 102. The CAN controller 101 is a control unit that sends send data CTx to the CAN buses B1 and B2, based on a control signal St from the local CPU 100, and that controls the acceptance of receive data CRx from the CAN buses B1 and B2. The transceiver 102 is a device that converts send data CTx from the CAN controller 101 into a signal CAN_H to the CAN bus B1 and a signal CAN_L to the CAN bus B2, and converts signals CAN_H and CAN_L from the CAN buses B1 and B2 to receive data CRx to be provided to the CAN controller 101. An operation clock CK is provided to the local CPU 100, CAN controller 101, and transceiver 102, respectively.

Figure 2:
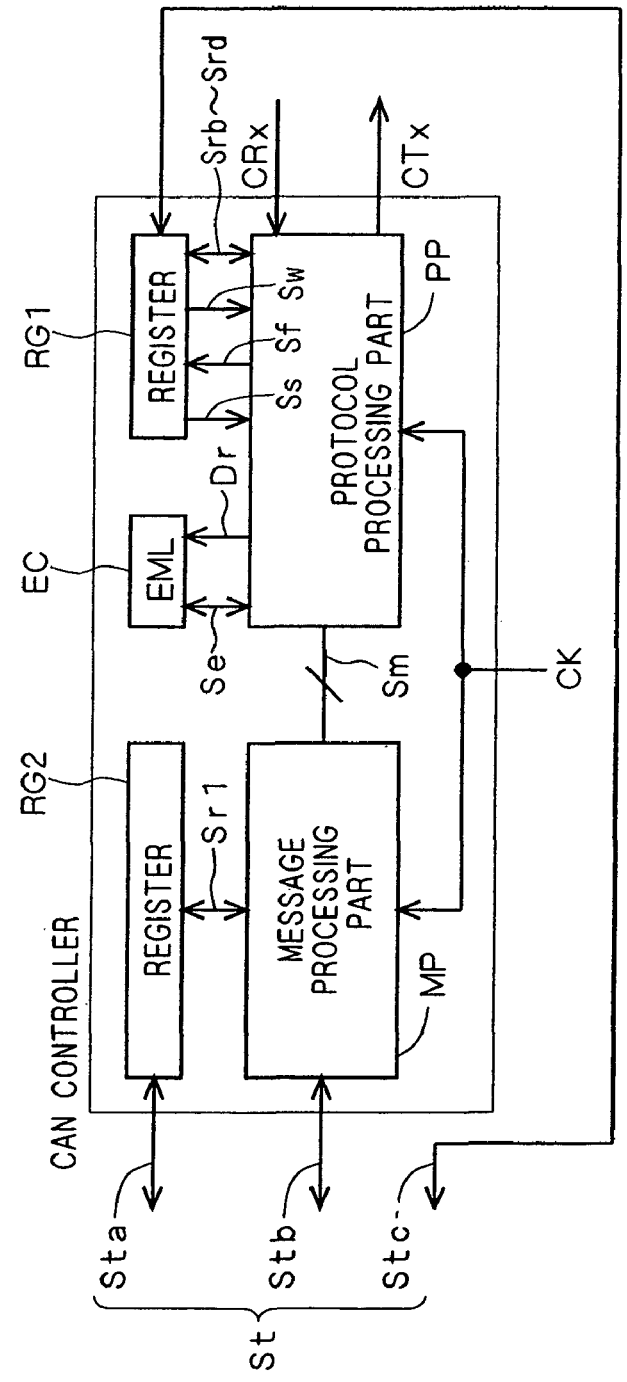
FIG. 2 is a diagram showing an internal configuration of a CAN controller.

FIG. 2 is a diagram showing the internal configuration of the CAN controller 101. The CAN controller 101 has a protocol processing part PP, an error management circuit (error management logic (EML)) EC, registers RG1 and RG2, and a message processing part MP.

The protocol processing part PP performs data format interpretation processing of receive data CRx according to a CAN protocol, and data format preparation processing of send data CTx according to a CAN protocol. The error management circuit EC checks whether error data is contained in the receive data CRx.

In this invention, the register RG1 can store a variety of error data information on the attribute of error data that should be generated. The protocol processing part PP can incorporate error data into the receive data CRx or the send data CTx, based on the error data information stored in the register RG1.

Once the protocol processing part PP incorporates error data into the receive data CRx based on the error data information, the error data can be incorporated into the receive data CRx in the interior of the ECU, thereby requiring no hardware for error data generation that is disposed externally of the CAN bus. Hence, for ISO11898, the error data generation and communication quality evaluation can be carried out accurately at the highest communication speed of 1 Mbps.

Further, in the interior of the ECU, the error data can be incorporated into the send data CTx, so that communication containing the error data is executable in a loop back mode. Therefore, testing as to whether the error management circuit EC can perform accurate error detection in the loop back mode makes it possible to check defects on the error management circuit EC itself.

The message processing part MP has a message slot (not shown) that holds receive message data contained in receive data CRx, and send message data to be contained in send data CTx, and determines the priority level of individual message data processing. The register RG2 stores a control signal Sr1 necessary for signal communication between the message processing part MP and the local CPU 100. A signal Sm is communicated between the protocol processing part PP and the message processing part MP.

A control signal St between the local CPU 100 and the CAN controller 101 contains a signal Sta for communication between the register RG2 and the local CPU 100, a signal Stb for communication between the message processing part MP and the local CPU 100, and a signal Stc for communication between the register RG1 and the local CPU 100.

Figure 3:
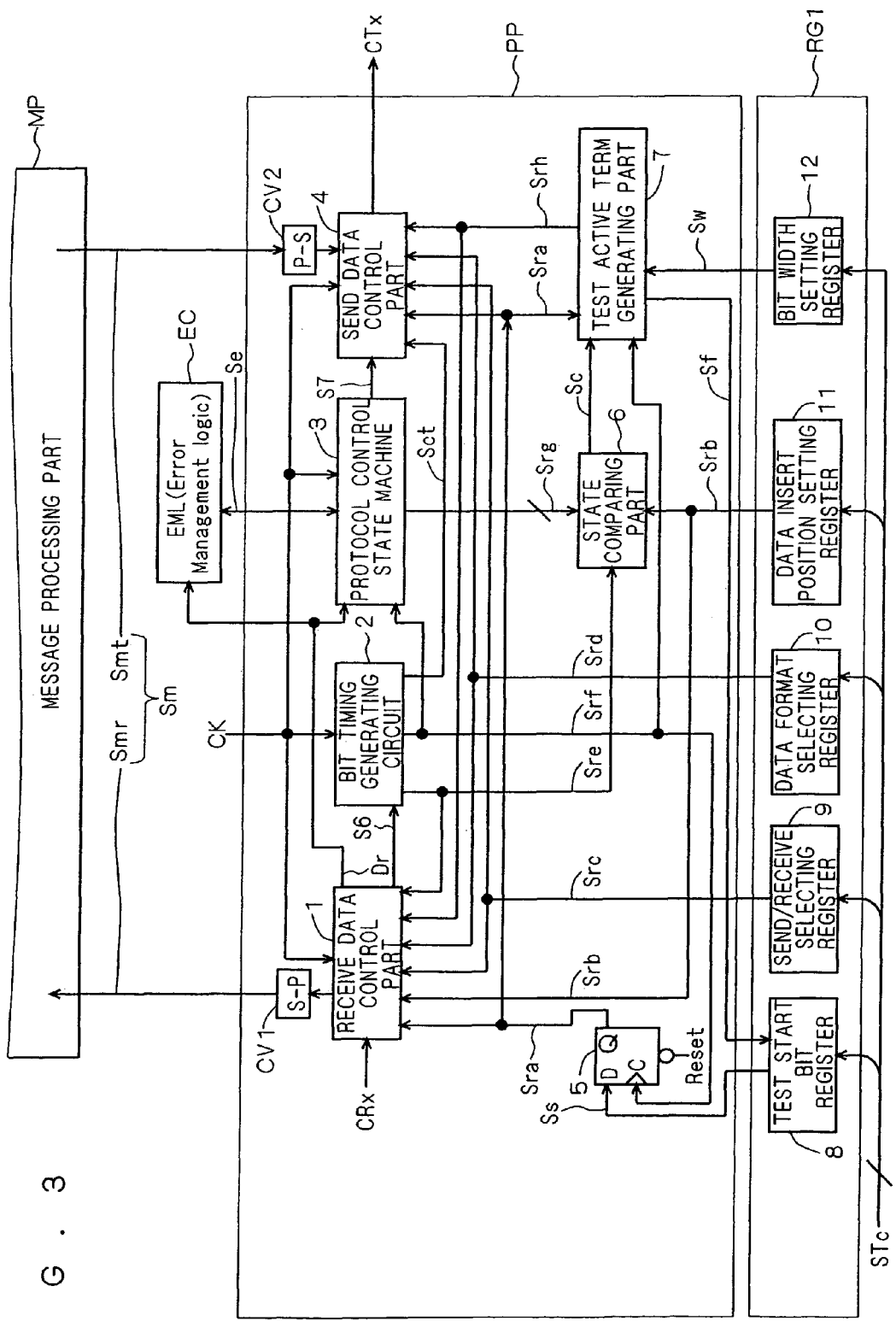
FIG. 3 is a diagram showing detailed configurations of a protocol processing part and a register.

FIG. 3 is a diagram showing detailed configurations of the protocol processing part PP and the register RG1. The protocol processing part PP has a receive data control part 1, a bit timing generating circuit 2, a state machine for protocol control (hereinafter referred to as protocol control state machine) 3, a send data control part 4, a latch circuit 5, a state comparing part 6, a test active term generating part 7, a S-P (from serial to parallel) converting part CV1, and a P-S (from parallel to serial) converting part CV2.

The receive data control part 1 is a control part that receives receive data CRx and sends this via the S-P conversion part CV1 to the message processing part MP, as a signal Smr, being part of a signal Sm, and that also sends the receive data CRx, as a signal Dr, to the protocol control state machine 3 and the error management circuit EC. The receive data control part 1 also sends the receive data CRx, as a signal S6, to the bit timing generating circuit 2.

In this invention, in addition to the above functions, the receive data control part 1 also has the function of incorporating error data into receive data CRx by replacing part of the receive data CRx with the error data.

The bit timing generating circuit 2 receives, as the signal S6, the receive data CRx from the receive data control part 1, and generates bit clocks Srf and Sre that are local operation clocks CLK_A and CLK_B in the protocol processing part PP, respectively, based on the signal S6 and the operation clock CK. The signal Srf as the local operation clock CLK_A is provided to the protocol control state machine 3, the latch circuit 5, and the test active term generating part 7. A signal Sre as the local operation clock CLK_B is provided to the receive data control part 1 and the state comparing part 6. A bit timing generating circuit 2 further generates a bit clock Sct that is a local operation clock tx_clk in the send data control part 4, based on the signal S6 and the operation clock CK.

The protocol control state machine 3 receives the signal Dr, and performs data format interpretation processing of the receive data CRx according to a CAN protocol. This interpretation processing comprises detecting, for example, data portion of a start of frame (SOF) in the receive data CRx, and data portion of an error detecting signal. The protocol control state machine 3 transmits, through a signal Se, the detection of the data portion of the error detecting signal to the error management circuit EC, such that the error management circuit EC can perform error detection processing of the signal Dr.

The protocol control state machine 3 performs data format preparation processing of send data CTx according to a CAN protocol, by providing a signal S7 to the send data control part 4. This preparation processing comprises adding, for example, a data portion of a start of frame (SOF) and a data portion of an error detecting signal to the send data CTx.

Moreover, the protocol control state machine 3 detects in which state of the data format according to the CAN protocol the currently processing receive data CRx or send data CTx is located, and outputs information on the next transition state to the comparing part 6 as a signal Srg.

The send data control part 4 receives via the P-S converting part CV2 the send message data from the message processing part MP, as a signal Smt that is part of the signal Sm, and also receives the signal S7 from the protocol control state machine 3, and then prepares and outputs them in the data format of the send data CTx.

In this invention, in addition to the above functions, the send data control part 4 has also the function of incorporating error data into send data CTx by replacing part of the send data CTx with the error data, and the function of inverting a stuff bit to obtain error data, and incorporating this into the send data CTx.

Incorporating error data into receive data CRx will be described in the first preferred embodiment, and incorporating error data into send data CTx will be described later in second and third preferred embodiments.

The register RG1 has a test start bit register 8, a send/receive selecting register 9, a data format selecting register 10, a data insert position setting register 11, and a bit width setting register 12. Each of information stored in the individual registers contained in the register RG1 is error data information on the attribute of error data generated.

Specifically, the information stored in the test start bit register 8 is information as to whether a test mode should be started or not. The information stored in the send/receive selecting register 9 is information as to whether error data should be inserted into send data CTx, or error data should be inserted into receive data CRx. The information stored in the data format selecting register 10 is information indicating that the data value to be inserted as error data is High or Low. The information stored in the data insert position setting register 11 is information on the position of send data CTx or receive data CRx into which error data should be inserted, or instruction information indicating that a stuff bit within send data CTx should be inverted to obtain error data. The bit width setting register 12 stores information indicating how long term of bit width the error data should be inserted. Each of the information stored in the register RG1 is contained in the signal Stc from the local CPU 100.

The latch circuit 5 is a D-flip flop: provided to its clock input terminal C is a bit clock Srf as a local operation clock CLK_A; and provided to its reset input terminal is a Reset signal. A signal Ss describing the information stored in the test start bit register 8 becomes an input D of the latch circuit 5 that is the D-flip flop. An output Q of the latch circuit 5 is provided, as a test_mod signal Sra, to the receive data control part 1, the send data control part 4, and the test active term generating part 7.

The information stored in the send/receive selecting register 9 is provided, as a Tx-Rx signal Src, to the receive data control part 1 and the send data control part 4. The information stored in the data format selecting register 10 is provided, as a data signal Srd, to the receive data control part 1 and the send data control part 4. The information stored in the data insert position setting register 11 is provided, as a signal Srb, to the receive data control part 1 and the state comparing part 6.

Figure 4:
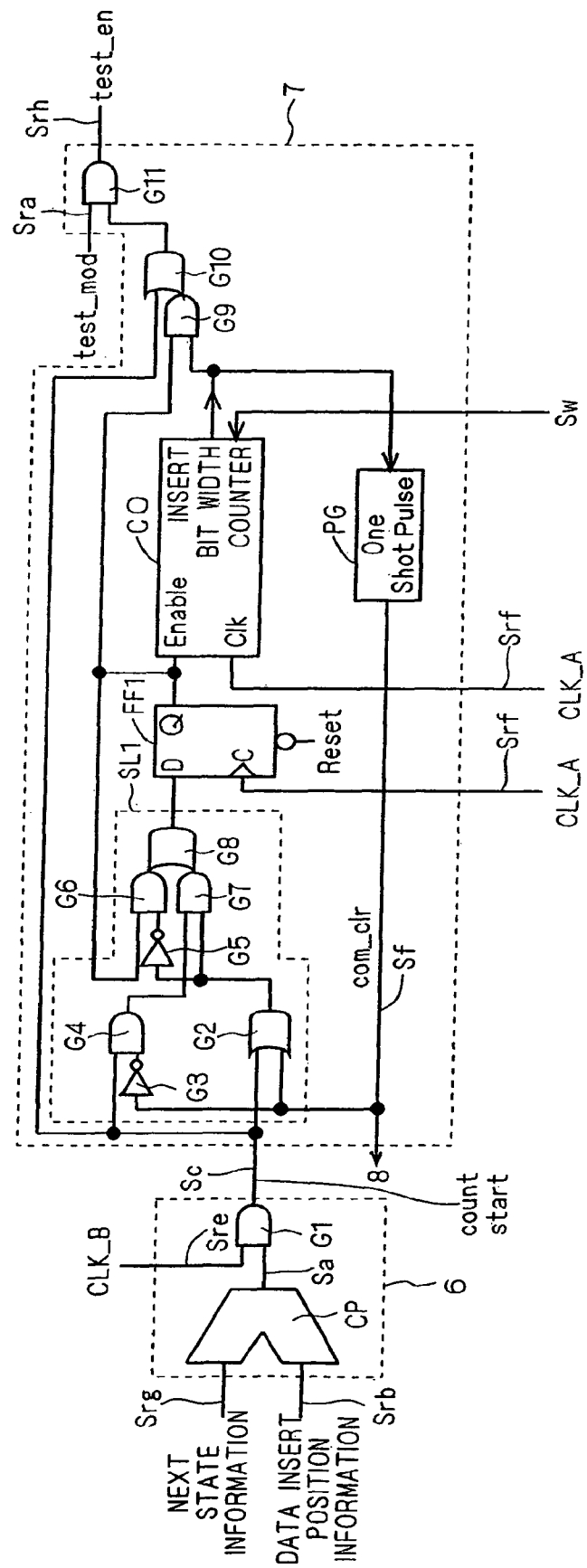
FIG. 4 is a diagram showing detailed configurations of a state comparing part and a test active term generating part.

FIG. 4 is a diagram showing detailed configurations of the state comparing part 6 and the test active term generating part 7.

The state comparing part 6 is equipped with a comparator CP and an AND gate G1. A signal Srg describing the next state information from the protocol control state machine 3 is provided to a first input terminal of the comparator CP, and a signal Srb describing the information stored in the data insert position setting register 11 is provided to a second input terminal of the comparator CP. When the next state information agrees with the information stored in the data insert position setting register 11, the state comparing part 6 activates its output signal Sa (that is High active).

A bit clock Sre that is a local operation clock CLK_B is provided to a first input terminal of the AND gate G1, and an output signal Sa of the comparator CP is provided to a second input terminal of the AND gate G1. When the bit clock Sre and the output signal Sa are both High, the AND gate G1 activates its output signal Sc (a count start signal).

The test active term generating part 7 is equipped with a selector circuit SL1, a D-flip flop FF1, an insert bit width counter CO, a one-shot pulse generating circuit PG, AND gates G9 and G11, and an OR gate G10.

The selector circuit SL1 contains AND gates G4, G6 and G7, OR gates G2 and G8, and inverting gates G3 and G5.

An output signal Sc from the state comparing part 6 is provided to a first input terminal of the AND gate G4, and an output of the inverting gate G3 is provided to a second input terminal of the AND gate G4. An output from the AND gate G4 is provided to a first input terminal of the AND gate G7, and an output of the OR gate G2 is provided to a second input terminal of the AND gate G7. An output Q of the D-flip flop FF1 is provided to a first input terminal of the AND gate G6, and an output of the OR gate G2 is provided via the inverting gate G5 to a second input terminal of the AND gate G6. An output of the AND gate G6 is provided to a first input terminal of the OR gate G8, and an output of the AND gate G7 is provided to a second input terminal of the OR gate G8. An output of the OR gate G8 becomes an input D of the D-flip flop FF1.

A bit clock Srf that is a local operation clock CLK_A is provided to a clock input terminal C of the D-flip flop FF1, and a Reset signal is provided to a reset input terminal.

An output Q of the D-flip flop FF1 is provided to an Enable terminal of the insert bit width counter CO, and a bit clock Srf that is a local operation clock CLK_A is provided to a clock input terminal Clk. A signal Sw describing the information stored in the bit width setting register 12 is also provided to the insert bit width counter CO.

An output Q of the D-flip flop FF1 is provided to a first input terminal of the AND gate G9, and an output of the insert bit width counter CO is provided to a second input terminal of the AND gate G9. An output signal Sc from the state comparing part 6 is provided to a first input terminal of the OR gate G10, and an output of the AND gate G9 is provided to a second input terminal of the OR gate G10. A test_mod signal Sra is provided to a first input terminal of the AND gate G11, and an output of the OR gate G10 is provided to a second input terminal of the AND gate G11. An output of the AND gate G11 is provided, as a test_en signal Srh, to the receive data control part 1 and the send data control part 4.

An output of the insert bit width counter CO is also provided to the one-shot pulse generating circuit PG. A com_clr signal Sf is outputted from the one-shot pulse generating circuit PG.

An output signal Sc from the state comparing part 6 is provided to a first input terminal of the OR gate G2, and a com_clr signal Sf is provided to a second input terminal of the OR gate G2. The com_clr signal Sf is also provided to an input terminal of the inverting gate G3 and the test start bit register 8.

Figure 5:
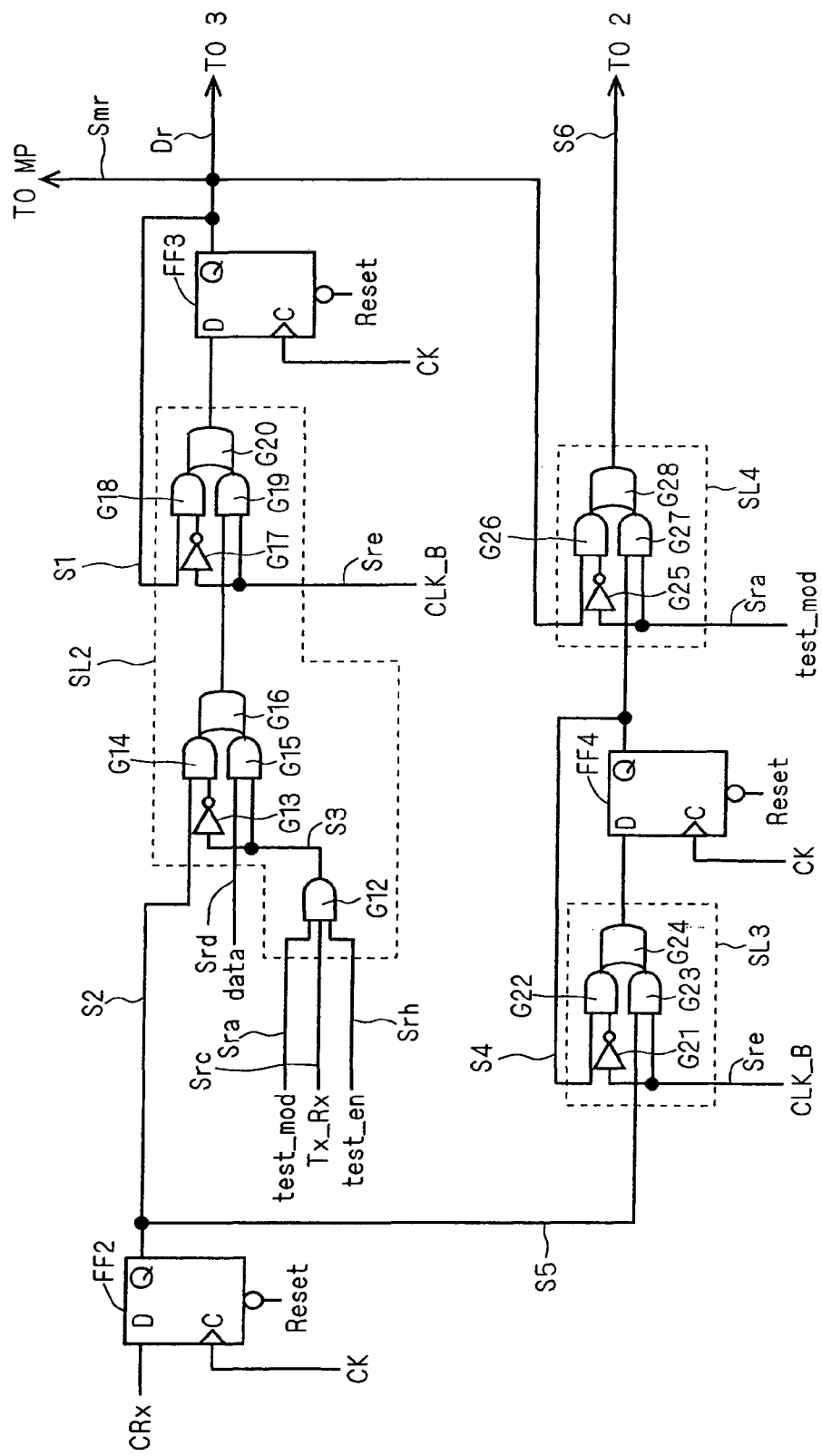
FIG. 5 is a diagram showing a detailed configuration of a receive data control part.

FIG. 5 is a diagram showing a detailed configuration of the receive data control part 1. The receive data control part 1 is equipped with D-flip flops FF2 to FF4, and selector circuits SL2 to SL4.

The receive data CRx becomes an input D of the D-flip flop FF2. An operation clock Ck is provided to a clock input terminal C of the D-flip flop FF2, and a Reset signal is provided to a reset input terminal.

The selector circuit SL2 contains AND gates G12, G14, G15, G18 and G19, OR gates G16 and G20, and inverting gates G13 and G17.

A test_mod signal Sra, a Tx-Rx signal Src and a test_en signal Srh are provided to first, second and third input terminals of the AND gate G12, respectively. When all of the signals Sra, Src and Srh are High, the AND gate G12 activates its output signal S3.

An output Q of the D-flip flop FF2 is provided, as a signal S2, to a first input terminal of the AND gate G14, and the output signal S3 from the AND gate G12 is provided via the inverting gate G13 to a second input terminal of the AND gate G14. A data signal Srd is provided to a first input terminal of the AND gate G15, and the output signal S3 from the AND gate G12 is provided to a second input terminal of the AND gate G15. An output of the AND gate G14 is provided to a first input terminal of the OR gate G16, and an output of the AND gate G15 is provided to a second input terminal of the OR gate G16.

An output Q of the D-flip flop FF3 is provided, as a signal S1, to a first input terminal of the AND gate G18, and a bit clock Sre that is a local operation clock CLK_B is provided via the inverting gate G17 to a second input terminal of the AND gate G18. An output of the OR gate G16 is provided to a first input terminal of the AND gate G19, and a bit clock Sre that is a local operation clock CLK_B is provided to a second input terminal of the AND gate G19. An output of the AND gate G18 is provided to a first input terminal of the OR gate G20, and an output of the AND gate G19 is provided to a second input terminal of the OR gate G20. An output of the OR gate G20 becomes an input D of the D-flip flop FF3.

An operation clock CK is provided to a clock input terminal C of the D-flip flop FF3, and a Reset signal is provided to a reset input terminal. An output Q of the D-flip flop FF3 is provided, as a signal Dr, to the protocol control state machine 3, and also provided, as a signal Smr, to the message processing part MP.

The selector circuit SL3 contains AND gates G22 and G23, an OR gate G24, and an inverting gate G21.

An output Q of the D-flip flop FF4 is provided, as a signal S4, to a first input terminal of the AND gate G22, and a bit clock Sre that is a local operation clock CLK_B is provided via the inverting gate G21 to a second input terminal of the AND gate G22. An output Q of the D-flip flop FF2 is provided, as a signal S5, to a first input terminal of the AND gate G23, and a bit clock Sre that is a local operation clock CLK_B is provided to a second input terminal of the AND gate G23. An output of the AND gate G22 is provided to a first input terminal of the OR gate G24, and an output of the AND gate G23 is provided to a second input terminal of the OR gate G24. An output of the OR gate G24 becomes an input D of the D-flip flop FF4.

An operation clock CK is provided to a clock input terminal C of the D-flip flop FF4, and a Reset signal is provided to a reset input terminal.

The selector circuit SL4 contains AND gates G26 and G27, an OR gate 28, and an inverting gate G25.

An output Q of the D-flip flop FF3 is provided to a first input terminal of the AND gate G26, and a test_mod signal Sra is provided via the inverting gate G25 to a second input terminal of the AND gate G26. An output Q of the D-flip flop FF4 is provided to a first input terminal of the AND gate G27, and a test_mod signal Sra is provided to a second input terminal of the AND gate G27. An output of the AND gate G26 is provided to a first input terminal of the OR gate G28, and an output of the AND gate G27 is provided to a second input terminal of the OR gate G28. An output of the OR gate G28 is provided, as a signal S6, to the bit timing generating circuit 2.

Figure 6:
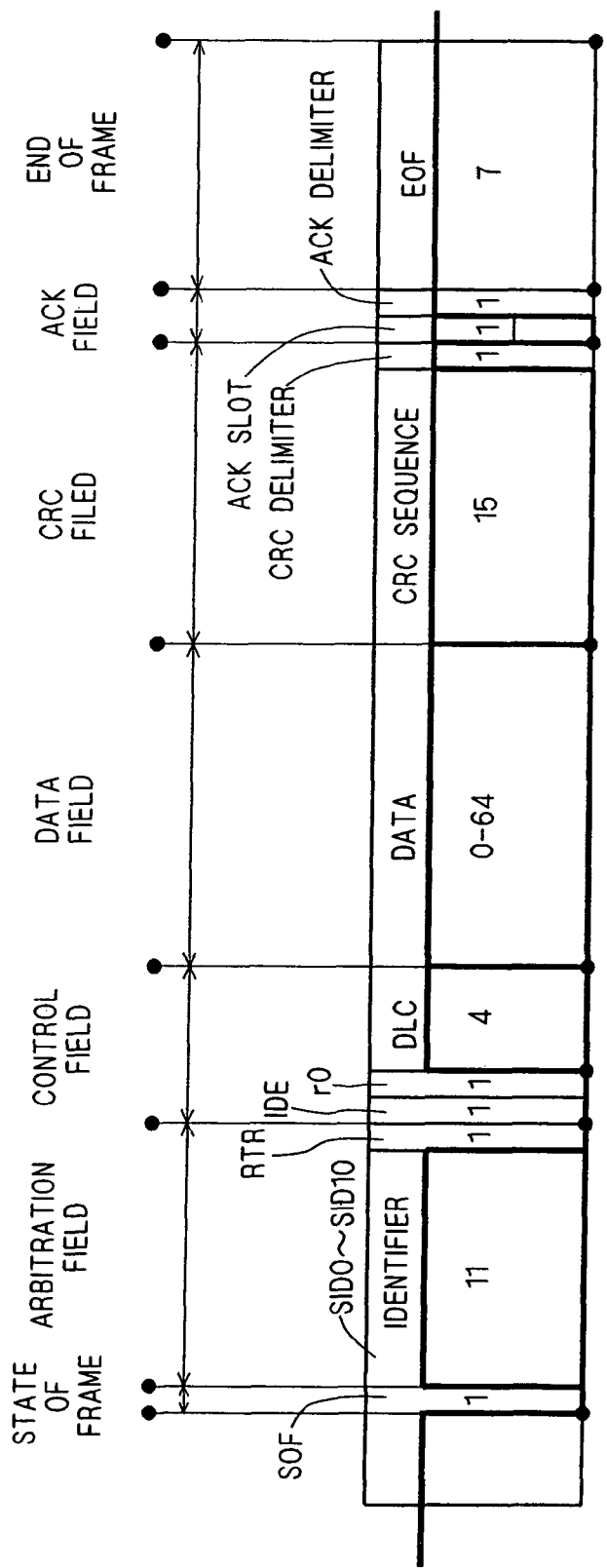
FIG. 6 is a diagram showing data formats of send data and receive data, according to a CAN protocol.

FIG. 6 is a diagram showing a frame format of a data frame in a standard format for send data CTx and receive data CRx, according to a CAN protocol. In this data format, the first 1-bit is start of frame (SOF), and the following continuous 11 bits are standard identifiers 0 to 10 (SID0 to SID10). These identifiers and the next 1-bit RTR bit configure an arbitration field.

Following the RTR bit, a 1-bit IDE bit, a 1-bit r0 bit and a 4-bit DLC bit configure a control field. Following the control field, a portion having any bit number of 0 to 64 configures a data field that is send message data or receive message data.

Following the data field, 15 bits are cyclic redundancy check (CRC) sequence bits that are error detecting signal portions, and they configure a CRC field together with the following 1-bit CRC delimiter.

Following the CRC field, a 1-bit ACK slot and a 1-bit ACK delimiter configure an ACK field. Following the ACK field, 7 bits are end of frame (EOF).

Figure 7:
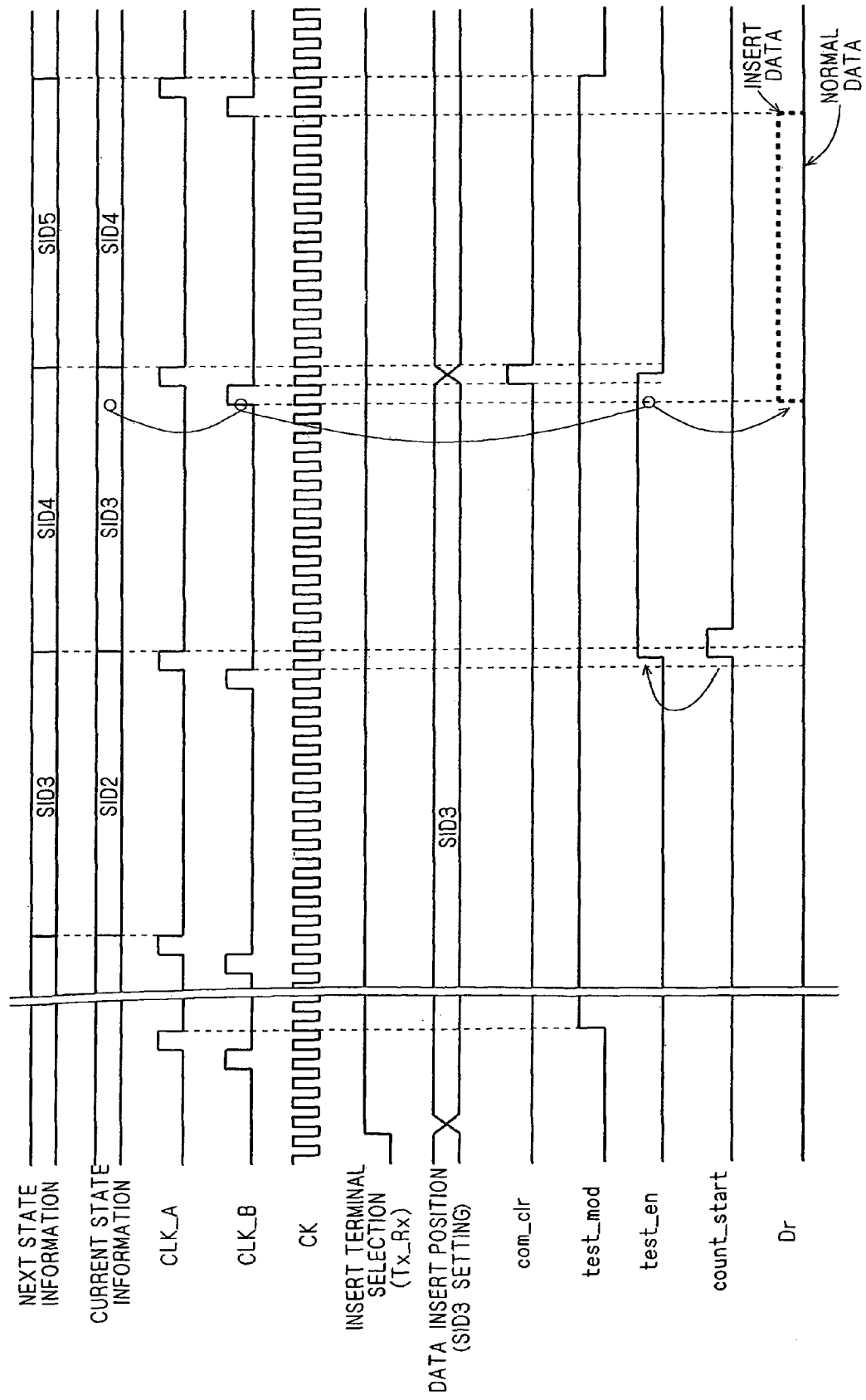
FIG. 7 is a timing chart when 1-bit High error data is inserted into an identifier portion within receive data.
Figure 8:
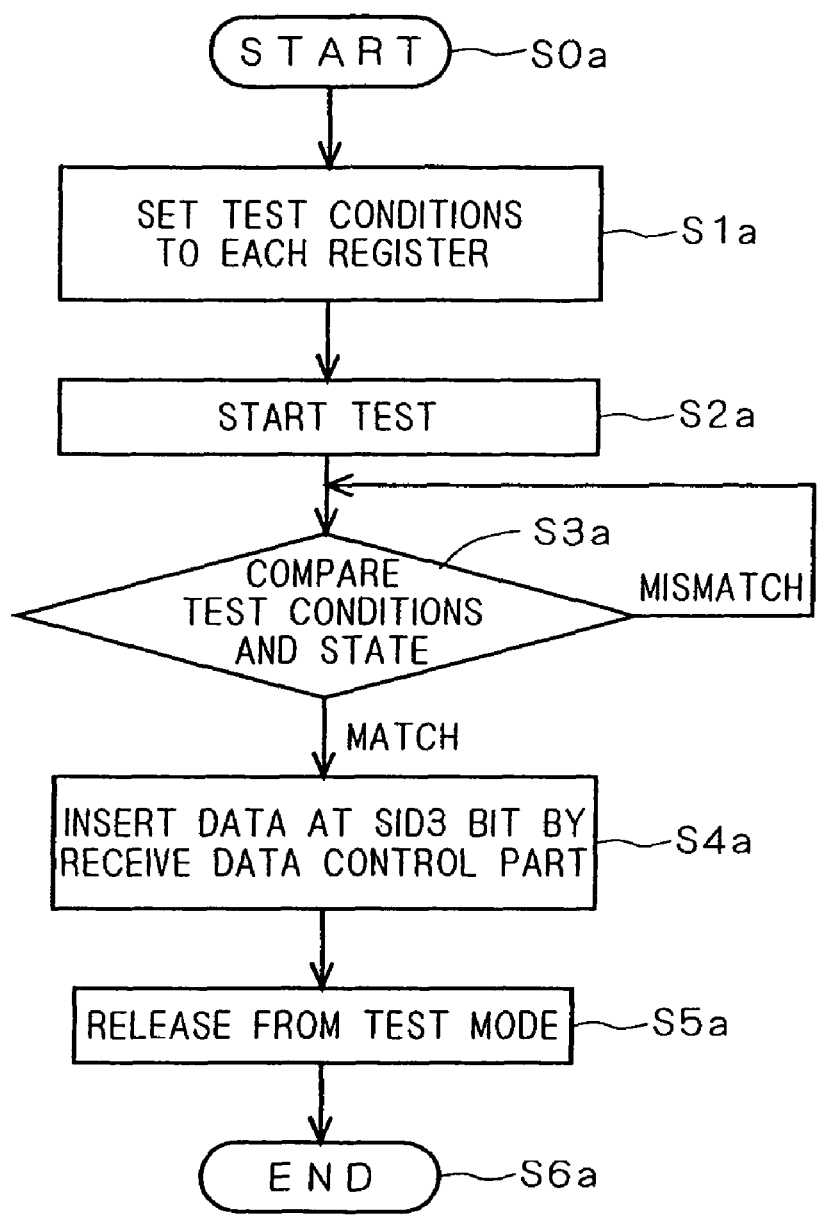
FIG. 8 is a flow chart when error data is inserted into receive data.

FIG. 7 is a timing chart for example when 1-bit High error data is inserted into an identifier SID 3 portion within receive data CRx in the CAN system of the invention. FIG. 8 is a flow chart when error data is inserted into receive data CRx.

First, when inserting error data, a user provides error data information on the attribute of error data via an I/O (input/output, not shown) interface to the local CPU 100 within an electric control unit, e.g., the U1, on which error detection should be performed.

The local CPU 100 sends its error data as a signal Stc to the register RG1, and sets test conditions (step S1a in FIG. 8). In the first preferred embodiment, 1-bit High error data is inserted into the identifier SID3 portion within the receive data CRx. Therefore, a High value indicating that "error data should be incorporated into a receive signal" is stored in the send/receive selecting register 9; a High value indicating "High error data" is stored in the data format selecting register 10; information on "SID3" is stored in the data insert position setting register 11; and information of "an amount of 1 bit" is stored in the bit width setting register 12. Based on this, a Tx_Rx signal Src from the send/receive selecting register 9 becomes High, and a data signal Srd from the data format selecting register 10 becomes High. A signal Srb from the data insert position setting register 11 becomes a content indicating "SID3," and a signal Sw from the bit width setting register 12 becomes a content indicating "an amount of 1 bit."

Once the above respective information are stored in the register RG1, the local CPU 100 sends High data that means "start of test" to the test start bit register 8 to start a test (step S2a in FIG. 8). Upon this, a signal Ss outputted from the test start bit register 8 becomes High, and a test_mod signal Sra outputted from the latch circuit 5 becomes High to the output of a local operation clock CLK_A, as shown in FIG. 7.

The comparator CP within the state comparing part 6 in FIG. 4 continues to monitor whether the content of a signal Srg describing the next state information from the protocol control state machine 3 becomes SID3 that is test conditions (step S3a in FIG. 8).

Once the content of the signal Srg describing the next state information from the protocol control state machine 3 becomes SID3, the comparator CP changes a signal Sa to High. If the local operation clock CLK_B becomes High in this state, the AND gate G1 changes a signal Sc to High.

If the signal Sc becomes High, the output of the AND gate G4 and the output of the OR gate G2 become High, and the input D of the D-flip flop FF1 becomes High via the AND gate G7 and the OR gate G8. In consideration of a gate delay within the selector circuit SL1, at the moment that the input D of the D-flip flop FF1 becomes High, the local operation clock CLK_A will become High, and the D-flip flop FF1 will latch the High of the input D, thereby outputting High to the output Q.

According to bit number information described in the signal Sw from the bit width setting register 12, the insert bit width counter CO counts by the amount of the bit number, and continues to output High during the counting. Since in the first preferred embodiment the information of "an amount of 1 bit" is described in the signal Sw, the insert bit width counter CO continues to output High for a period of 1 bit.

On receipt of the output of the D-flip flop FF1 and the output of the insert bit width counter CO, the AND gate G9 changes its output to High. This output is transmitted via the OR gate G10 to the AND gate G11.

Since the test_mod signal Sra is High at this time, the test_en signal Srh that is the output of the AND gate G11 becomes High.

In the receive data control part 1, the test_en signal Srh received by the AND gate G12 within the selector circuit SL2 becomes High, so that the AND gate G12 changes a signal S3 to High. Consequently, in place of the signal S2 that has been outputted till then from the OR gate G16, the signal Srd of High, as a data signal that has been inputted to the AND gate G15, will be outputted from the OR gate G16.

When the High of the next local operation clock CLK_B appears, the AND gate G19 transmits a High signal Srd via the OR gate G20 to the input D of the D-flip flop FF3. Even when the local operation clock CLK_B returns to Low, the output Q of the D-flip flop FF3 can be selected in the state of High by the AND gate G18, so that the output Q of the D-flip flop FF3 can retain High.

Consequently, the SID3 of the receive data CRx, originally being Low, will be replaced with error data, being High, and sent as a signal Smr and a signal Dr, to the message processing part MP, the protocol control state machine 3, and the error management circuit EC, as shown at the lowermost stage of the timing chart in FIG. 7 (step S4a in FIG. 8).

The case of being released from a test mode will be described below (step S5a in FIG. 8). When the output of the insert bit width counter CO transits from High to Low, the one-shot pulse generating circuit PG changes a com_clr signal Sf to High.

When the com_clr signal Sf becomes High, the output of the AND gate G2 becomes High, and the output of the AND gate G4 is transmitted via the AND gate G7 and the OR gate G8 to the D-flip flop FF1. Since the com_clr signal Sf is already inputted, as Low, to the AND gate G4 via the inverting gate G3, the output of the AND gate G4 is in the state of Low. Accordingly, the D-flip flop FF1 outputs Low, and this output Q is transmitted via the AND gate G9 and the OR gate G10 to the AND gate G11. Upon this, a test_en signal Srh that is the output of the AND gate G11 becomes Low.

In the receive data control part 1, in response to the change to Low in the test_en signal Srh, the AND gate G12 outputs Low, and therefore the AND gate G14 outputs again the signal S2 of the receive data CRx. Hence, when the next local operation clock CLK_B becomes High, the signal S2 of the receive data CRx, not being replaced with error data, is outputted from the OR gate G20 to the D-flip flop FF3.

Therefore, as shown in the lowermost state of the timing chart in FIG. 7, following the SID3 of the receive data CRx that has been replaced with error data, being High, SID4 of the receive data CRx, not being replaced with error data, is sent to the message processing part MP, the protocol control state machine 3, and the error management circuit EC, as signal Smr and signal Dr.

Specifically, on receipt of receive data CRx, the receive data control part 1 replaces, when the interpretation processing position of the receive data CRx reaches the SID3, being the error data insert position, the receive data CRx with error data having a bit width (an amount of 1 bit) set at the bit width setting register 12, and having a data value (High) set at the data format selecting register 10, and then outputs as a signal Dr to the error management circuit EC, thereby enabling to incorporate the error data into the receive data CRx.

Thus, the protocol processing part PP has the receive data control part 1 that can incorporate error data into receive data CRx by replacing the receive data CRx with the error data and outputs to the error management circuit EC, when the interpretation processing position of the receive data CRx reaches the error data insert position. This permits accurate generation of error data at a desired position in the receive data CRx, thereby verifying whether error data is detectable on the error management circuit EC.

In the receive data control part 1, if no error data is inserted when the test_mod signal in Low state, the selector circuit SL4 selects receive data CRx via the selector circuit SL2 and the D-flip flop FF3, and provides it as a signal S6 to the bit timing generating circuit 2.

On the other hand, if the test_mod signal becomes High and error data is being inserted, the selector circuit SL4 selects, via the selector circuit SL3 and the D-flip flop FF4, receive data CRx that is not replaced with error data, instead of the output of the D-flip flop FF3 into which error data is inserted, and then provides it as a signal S6 to the bit timing generating circuit 2.

In other words, the receive data control part 1 can supply the bit timing generating circuit 2 with receive data CRx, without replacing it with error data, whilst the receive data CRx is being replaced with error data and outputted to the error management circuit EC.

If bit clocks Sre and Srf are generated based on the replaced error data, timing correction of the bit clocks Sre and Srf does not depend on the value on the CAN bus. Therefore, correction timing drift with other units may occur in some case. However, the bit timing generating circuit 2 always generates bit clocks Sre and Srf depending on the value on the CAN bus, not being replaced. This eliminates the possibility of correction timing drift with other units.

Second Preferred Embodiment

A second preferred embodiment describes the case of incorporating error data into send data CTx in the CAN system of the first preferred embodiment.

Figure 9:
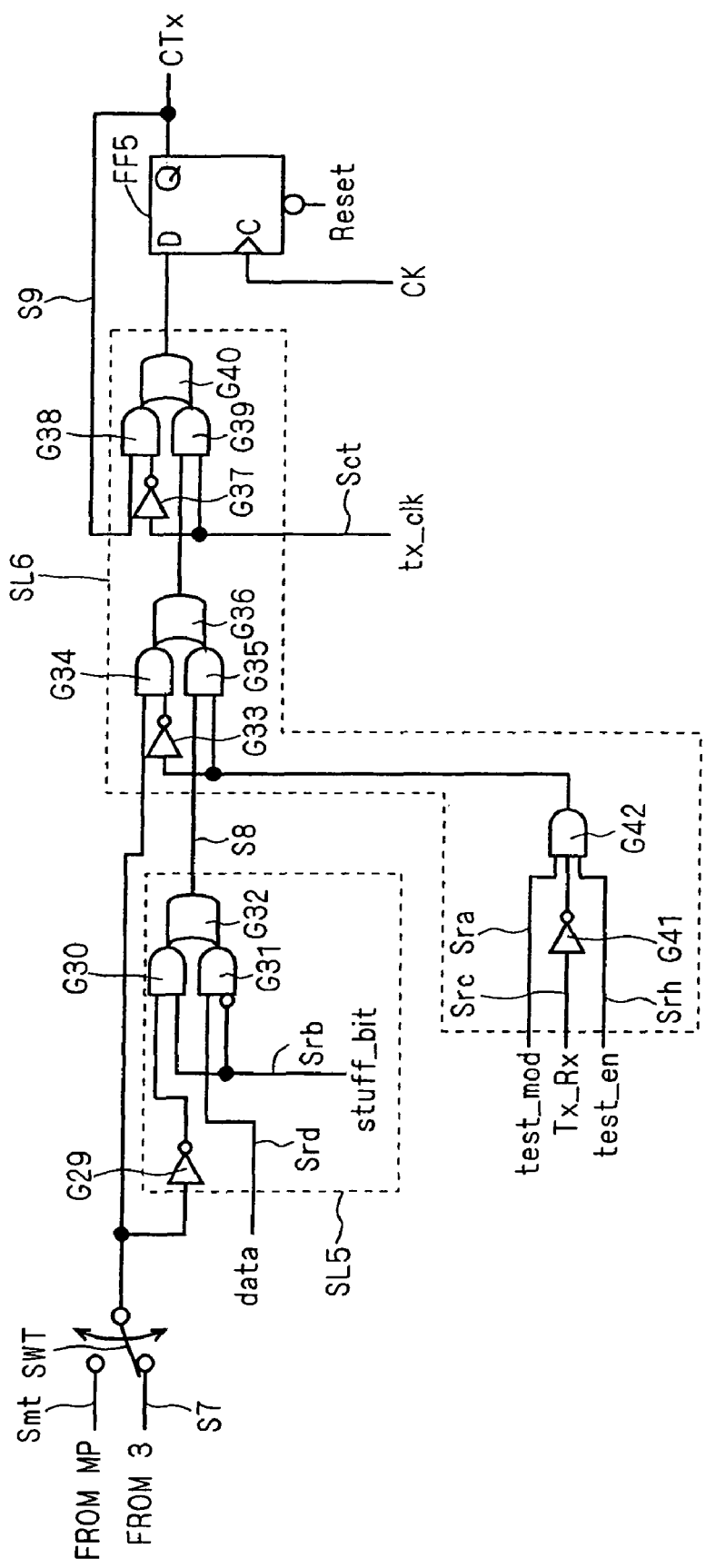
FIG. 9 is a diagram showing a detailed configuration of a send data control part.

FIG. 9 is a diagram showing a detailed configuration of a send data control part 4. The send data control part 4 is equipped with a switch SWT, a D-flip flop FF5, and selector circuits SL5 and SL6.

As a signal S7, a start of frame (SOF) and data for arbitration field generation are provided from a protocol control state machine 3 via the switch SWT to the send data control part 4. At the stage of generating a data field, send message data is provided as a signal Smt from the message processing part MP via the switch SWT to the send data control part 4. Then, at the stages of generating a CRC data field, an ACK field and an end of frame, data that should be generated at each of these stages are further provided, as a signal S7, from the protocol control state machine 3 via the switch SWT. This enables a data format of receive data CTx to be prepared. The protocol control state machine 3 controls the switch SWT.

The selector circuit SL5 contains AND gates G30 and G31, an OR gate G32, and an inverting gate G29.

An output of the switch SWT is provided via the inverting gate G29 to a first input terminal of the AND gate G30, and stuff_bit instruction information Srb about error insertion during stuff bit mode is provided to a second input terminal of the AND gate G30. A data signal Srd is provided to a first input terminal of the AND gate G31, and stuff_bit instruction information Srb about error insertion during the stuff bit mode is inverted and provided to a second input terminal of the AND gate G31. An output of the AND gate G30 is provided to a first input terminal of the OR gate G32, and an output of the AND gate G31 is provided to a second input terminal of the OR gate G32.

The term "stuff bit" indicates a bit that can be generated by inverting, when a plurality of bits (e.g., an amount of 5 bits) continuously have the same data value (High or Low), this data value. A stuff bit so generated is inserted into send data CTx to be used for error detection at the time of receive. The processing for generating and inserting a stuff bit are specified in a CAN protocol.

In this invention, a state in which a stuff bit is inserted into send data CTx is referred to as a "stuff bit mode," and the term "error insertion during stuff bit mode" indicates that an inverted stuff bit should be again inverted to obtain error data. Therefore, when the data value of stuff bit instruction information Srb is High, the stuff bit is again inverted so that it is converted to error data. When the data value of stuff_bit instruction information Srb is Low, no error is forced to occur in the stuff bit.

The error insertion during stuff bit mode will be described in a third preferred embodiment. The second preferred embodiment will describe the case of inserting error data at a predetermined position in receive data CTx, based on position information stored in the data insert position setting register 11, instead of causing an error in a stuff bit. Hence in the second preferred embodiment, the data value of stuff_bit instruction information Srb is Low.

With this configuration, a data signal Srd is always outputted as an output signal S8 from the OR gate G32 in the second preferred embodiment.

The selector circuit SL6 contains AND gates G42, G34, G35, G38 and G39, OR gates G36 and G40, and inverting gates G33, G37 and G41.

A test_mod signal Sra, a Tx_Rx signal Src and a test_en signal Srh are provided to first, second and third input terminals of the AND gate G42, respectively. The AND gate G42 activates its output when the signals Sra and Srh are High, and the signal Src is Low.

An output of the switch SWT is provided to a first input terminal of the AND gate G34, and an output from the AND gate G42 is provided via the inverting gate G33 to a second input terminal of the AND gate 34. An output signal S8 from the OR gate G32 that is data signal Srd is provided to a first input terminal of the AND gate G35, and an output from the AND gate G42 is provided to a second input terminal of the AND gate G35. An output of the AND gate G34 is provided to a first input terminal of the OR gate G36, and an output of the AND gate G35 is provided to a second input terminal of the OR gate G36.

An output Q of the D-flip flop FF5 is provided as a signal S9 to a first input terminal of the AND gate G38, and a bit clock Sct that is a local operation clock tx_clk in the send data control part 4 is provided via the inverting gate G37 to a second input terminal of the AND gate G38. An output of the OR gate G36 is provided to a first input terminal of the AND gate G39, and a bit clock Sct that is a local operation clock tx_clk is provided to a second input terminal of the AND gate G39. An output of the AND gate G38 is provided to a first input terminal of the OR gate G40, and an output of the AND gate 39 is provided to a second input terminal of the OR gate G40. An output of the OR gate G40 becomes an input D of the D-flip flop FF5.

An operation clock CK is provided to a clock input terminal C of the D-flip flop FF5, and a Reset signal is provided to a reset input terminal. An output Q of the D-flip flop FF5 is outputted as a send data signal CTx.

Figure 10:
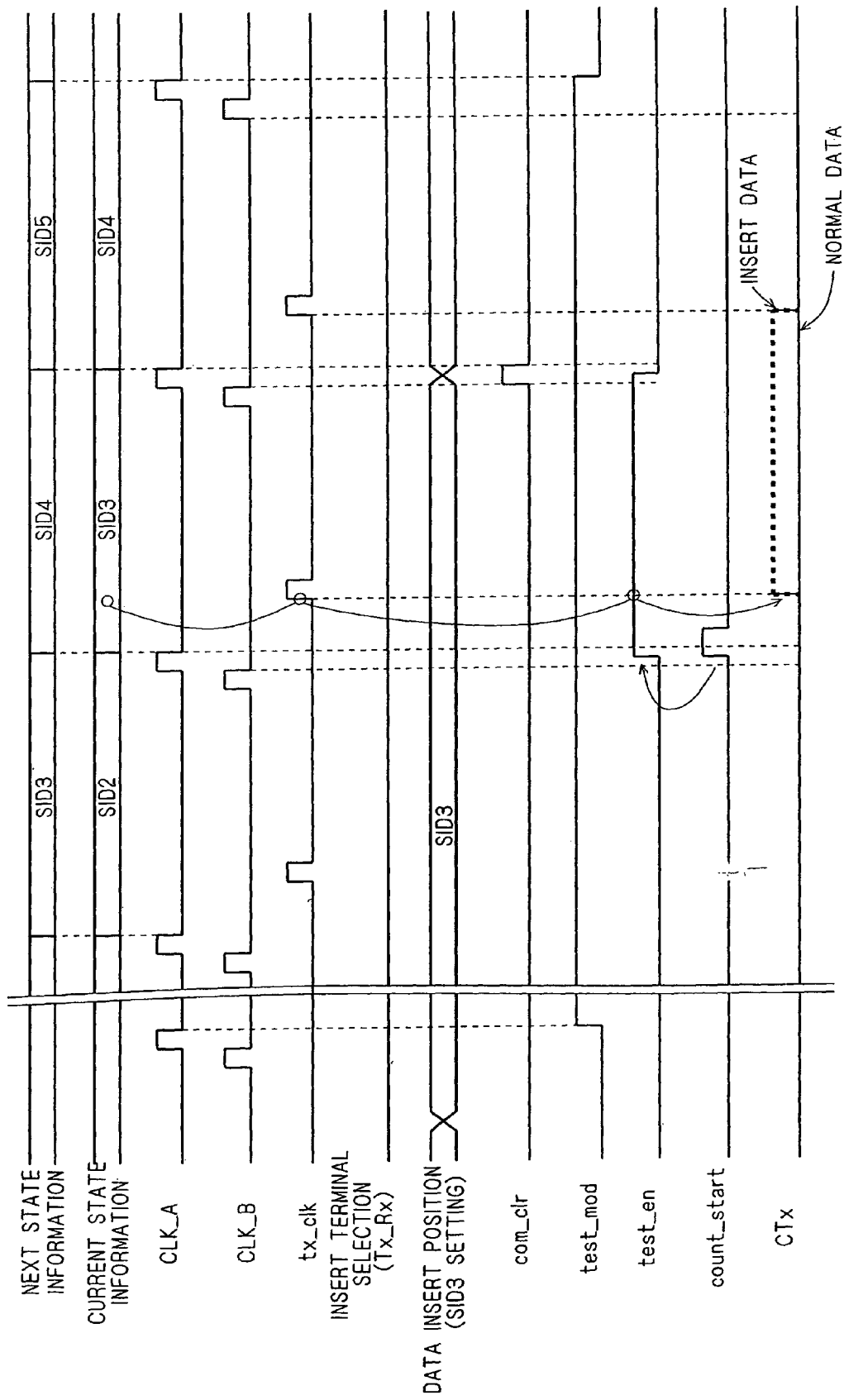
FIG. 10 is a timing chart when 1-bit High error data is inserted into an identifier portion within send data.
Figure 11:
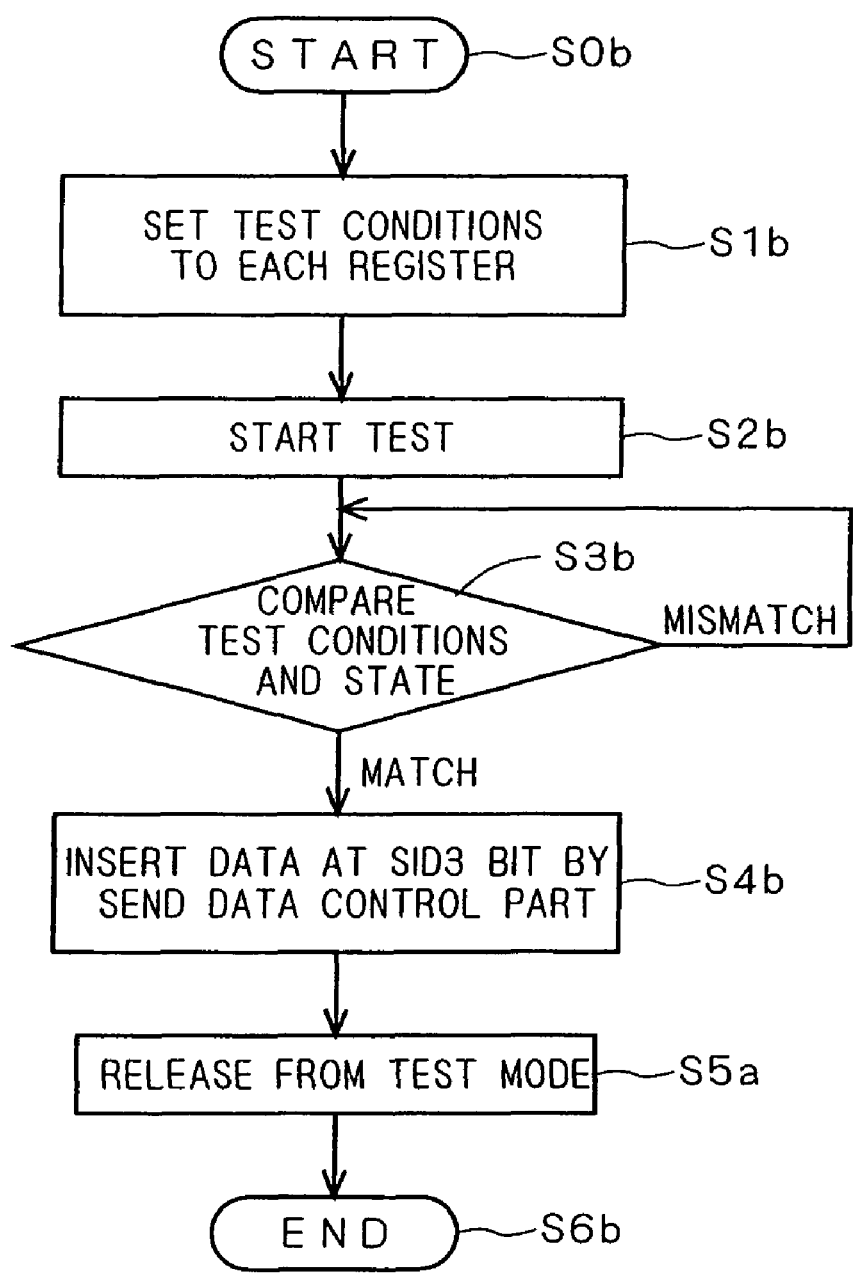
FIG. 11 is a flow chart when error data is inserted into send data.

FIG. 10 is a timing chart for example when 1-bit High error data is inserted into an identifier SID 3 portion within send data CTx in the CAN system of the invention. FIG. 11 is a flow chart when error data is inserted into send data CTx.

First, when inserting error data, a user provides error data information on the attribute of error data via an I/O (input/output, not shown) interface to the local CPU 100 within an electric control unit, e.g., the U1, on which error detection should be performed.

The local CPU 100 sends the error data information as a signal Stc to the register RG1, and sets test conditions (step S1b in FIG. 11). In the second preferred embodiment, 1-bit High error data is inserted into the identifier SID3 portion within the send data CTx. Therefore, a Low value indicating that "error data should be incorporated into a send signal" is stored in the send/receive selecting register 9; a High value indicating "High error data" is stored in the data format selecting register 10; information on "SID3" is stored in the data insert position setting register 11; and information of "an amount of 1 bit" is stored in the bit width setting register 12. Based on this, a Tx_Rx signal Src from the send/receive selecting register 9 becomes Low, and a data signal Srd from the data format selecting register 10 becomes High. A signal Srb from the data insert position setting register 11 becomes a content indicating "SID3," and a signal Sw from the bit width setting register 12 becomes a content indicating "an amount of 1 bit."

Once the above individual information are stored in the register RG1, the local CPU 100 sends High data that means "start of test" to the test start bit register 8 to start a test (step S2b in FIG. 11). Upon this, a signal Ss outputted from the test start bit register 8 becomes High, and a test_mod signal Sra outputted from the latch circuit 5 becomes High to the output of a local operation clock CLK_A, as shown in FIG. 10.

The comparator CP within the state comparing part 6 in FIG. 4 continues to monitor whether the content of a signal Srg describing the next state information from the protocol control state machine 3 becomes SID3 that is test conditions (step S3b in FIG. 11).

When the content of a signal Srg describing the next state information from the protocol control state machine 3 becomes SID3, the comparator CP changes a signal Sa to High. When the local operation clock CLK_B becomes High in this state, the AND gate G1 changes a signal Sc to High.

When the signal Sc becomes High, the output of the AND gate G4 and the output of the OR gate G2 become High, and the input D of the D-flip flop FF1 becomes High via the AND gate G7 and the OR gate G8. In consideration of a gate delay within the selector circuit SL1, at the moment that the input D of the D-flip flop FF1 becomes High, the local operation clock CLK_A will become High, and the D-flip flop FF1 will latch the High of the input D, thereby outputting High to the output Q.

According to the information on a bit number described in the signal Sw from the bit width setting register 12, the insert bit width counter CO counts by the amount of the bit number, and continues to output High during the counting. Since in the second preferred embodiment the information of "an amount of 1 bit" is described in the signal Sw, the insert bit width counter CO continues to output High for a period of 1 bit.

On receipt of the output of the D-flip flop FF1 and the output of the insert bit width counter CO, the AND gate G9 changes its output to High. This output is transmitted via the OR gate G10 to the AND gate G11.

Since the test_mod signal Sra is High at this time, a test_en signal Srh that is the output of the AND gate G11 becomes High.

In the send data control part 4, the test_en signal Srh received by the AND gate G42 within the selector circuit SL6 becomes High, so that the AND gate G42 changes its output to High. As a result, in place of the output signal from the switch SWT that has been outputted from the OR gate G36, the signal Srd of High, being a data signal that has been inputted to the AND gate G35, will be outputted from the OR gate G36.

When the High of the next local operation clock tx_clk appears, the AND gate G39 transmits a High signal Srd via the OR gate G40 to the input D of the D-flip flop FF5. Even when the local operation clock tx_clk returns to Low, the output Q of the D-flip flop FF5 can be selected in the state of High by the AND gate G38, so that the output Q of the D-flip flop FF5 can retain High.

Consequently, as shown at the lowermost stage of the timing chart in FIG. 10, the SID3 of the send data CTx, originally being Low, will be replaced with error data, being High, and then outputted (step S4b in FIG. 11). In this state, transition to loop back mode may take place to verify the receive data CRx on the error management circuit EC.

The case of being released from a test mode will be described below (step S5b in FIG. 11). When the output of the insert bit width counter CO transits from High to Low, the one-shot pulse generating circuit PG changes a com_clr signal Sf to High.

If the com_clr signal Sf becomes High, the output of the AND gate G2 becomes High, and the output of the AND gate G4 is transmitted via the AND gate G7 and the OR gate G8 to the D-flip flop FF1. Since the com_clr signal Sf is already inputted, as Low, to the AND gate G4 via the inverting gate G3, the output of the AND gate G4 is in the state of Low. Accordingly, the D-flip flop FF1 outputs Low, and this output Q is transmitted via the AND gate G9 and the OR gate G10 to the AND gate G11. Upon this, a test_en signal Srh, being the output of the AND gate G11, becomes Low.

In the send data control part 4, if the test_en signal Srh changes to Low, the AND gate G42 outputs Low, so that the AND gate G34 outputs again a signal from the switch SWT. Accordingly, when the next local operation clock tx_clk becomes High, a signal of the send data CTx, not being replaced with error data, is outputted from the OR gate G40 to the D-flip flop FF5.

Therefore, following the SID3 of the send data CTx that has been replaced with error data, being High, SID4 of the send data CTx that is not replaced with error data will be outputted as shown in the lowermost state of the timing chart in FIG. 10.

In other words, the send data control part 4 can prepare, in the data format of send data CTx, the signal Smt that is send message data from the message processing part MP. When the preparation processing position of the send data CTx reaches the SID3 that is the error data insert position, the send data control part 4 replaces the send data CTx with error data having a bit width (an amount of 1 bit) set at the bit width setting register 12, and a data value (High) set at the data format selecting register 10, and then outputs it, thereby incorporating the error data into the send data CTx.

Thus, the protocol processing part PP has the send data control part 4 that, when the preparation processing position of send data CTx reaches the error data insert position, replaces the send data CTx with the error data and then outputs it, thereby incorporating the error data into the send data CTx. This permits accurate generation of error data at a desired position in the send data CTx, thereby verifying whether error data is detectable on the error management circuit EC even in a loop back mode.

Third Preferred Embodiment

A third preferred embodiment describes a case where an inverted stuff bit is again inverted to obtain error data, as set forth in the second preferred embodiment. Therefore, in the third preferred embodiment, the data value of the stuff_bit instruction information Srb is High in FIG. 9.

With this configuration, as an output signal S8 from the OR gate G32, the inverted one of an output signal from the switch SWT can be always outputted via the inverting gate G29 in the third preferred embodiment.

FIG. 12 is a timing chart when the inverted stuff bit is again inverted to obtain error data during stuff bit mode. FIG. 13 is a flow chart when a stuff bit is converted to error data.

First, when inserting error data, a user provides error data information on the attribute of error data via an I/O (input/output, not shown) interface to the local CPU 100 within an electric control unit, e.g., the U1, on which error detection should be performed.

The local CPU 100 sends the error data information as a signal Stc to the register RG1, and sets test conditions (step S1c in FIG. 13). In the third preferred embodiment, the stuff bit portion within send data CTx is again inverted to obtain error data. Therefore, a Low value indicating that "error data should be incorporated into a send signal" is stored in the send/receive selecting register 9; a High or Low value is stored in the data format selecting register 10; information indicating that "the data value of stuff_bit instruction information Srb should be High" is stored in the data insert position setting register 11; and information of "an amount of 1 bit" is stored in the bit width setting register 12. Since the stuff bit is usually set to an amount of 1 bit, information of "an amount of 1 bit" is stored in the bit width setting register 12.

Based on this, a Tx_Rx signal Src from the send/receive selecting register 9 becomes Low, and a signal Srb from the data insert position setting register 11 becomes "stuff_bit instruction information having a High data value." The signal Sw from the bit width setting register 12 becomes a content indicating "an amount of 1 bit."

Once the above respective information are stored in the register RG1, the local CPU 100 sends High data that means "start of test" to the test start bit register 8 to start a test (step S2c in FIG. 13). Upon this, a signal Ss outputted from the test start bit register 8 becomes High, and a test_mod signal Sra outputted from the latch circuit 5 becomes High to the output of a local operation clock CLK_A, as shown in FIG. 12.

The comparator CP within the state comparing part 6 in FIG. 4 continues to monitor whether the content of a signal Srg describing the next state information from the protocol control state machine 3 becomes SID3 that is test conditions (step S3c in FIG. 13).

When the content of the signal Srg describing the next state information from the protocol control state machine 3 becomes SID3, the comparator CP changes a signal Sa to High. When the local operation clock CLK_B becomes High in this state, the AND gate G1 changes a signal Sc to High.

When the signal Sc becomes High, the output of the AND gate G4 and the output of the OR gate G2 become High, and the input D of the D-flip flop FF1 becomes High via the AND gate G7 and the OR gate G8. In consideration of a gate delay within the selector circuit SL1, at the moment that the input D of the D-flip flop FF1 becomes High, the local operation clock CLK_A will become High, and the D-flip flop FF1 will latch the High of the input D, thereby outputting High to the output Q.

According to the information on a bit number information described in the signal Sw from the bit width setting register 12, the insert bit width counter CO counts by the amount of the bit number, and continues to output High during the counting. Since in the third preferred embodiment the information of "an amount of 1 bit" is already described in the signal Sw, the insert bit width counter CO continues to output High for a period of 1 bit.

On receipt of the output of the D-flip flop FF1 and the output of the insert bit width counter CO, the AND gate G9 changes its output to High. This output is transmitted via the OR gate G10 to the AND gate G11.

Since the test_mod signal Sra is High at this time, a test_en signal Srh that is the output of the AND gate G11 becomes High.

In the send data control part 4, the test_en signal Srh received by the AND gate G42 within the selector circuit SL6 becomes High, so that AND gate G42 changes its output to High. As a result, in place of the output signal from the switch SWT that has been outputted from the OR gate G36, the inverted signal of the output of the switch SWT that has been inputted to the AND gate G35 will be outputted from the OR gate G36.

When the High of the next local operation clock tx_clk appears, the AND gate G39 transmits an inverted signal of the output of the switch SWT via the OR gate G40 to the input D of the D-flip flop FF5. Even when the local operation clock tx_clk returns to Low, the output Q of the D-flip flop FF5 can be selected by the AND gate G38, so that the output Q of the D-flip flop FF5 can retain the inverted state of the output of the switch SWT.

Consequently, the stuff bit of the send data CTx, originally being High, will be replaced with error data, being Low, and then outputted as shown at the lowermost stage of the timing chart in FIG. 12 (step S4c in FIG. 13). In this state, transition to loop back mode may take place to verify the receive data CRx on the error management circuit EC.

The case of being released from a test mode will be described below (step S5c in FIG. 13). When the output of the insert bit width counter CO transits from High to Low, the one-shot pulse generating circuit PG changes a com_clr signal Sf to High.

When the com_clr signal Sf becomes High, the output of the AND gate G2 becomes High, and the output of the AND gate G4 is transmitted via the AND gate G7 and the OR gate G8 to the D-flip flop FF1. Since the com_cr signal Sf is already inputted, as Low, to the AND gate G4 via the inverting gate G3, the output of the AND gate G4 is in the state of Low. Accordingly, the D-flip flop FF1 outputs Low, and this output Q is transmitted via the AND gate G9 and the OR gate G10 to the AND gate G11. Upon this, a test_en signal Srh that is the output of the AND gate G11 becomes Low.

In the send data control part 4, if the test_en signal Srh changes to Low, the AND gate G42 outputs Low, so that the AND gate G34 outputs again a signal from the switch SWT. Accordingly, when the next local operation clock tx_clk becomes High, a signal of the send data CTx, not being replaced with error data, is outputted from the OR gate G40 to the D-flip flop FF5.

Consequently, following the send data CTx that has been replaced with error data, being re-inverted stuff bit, normal data that is not stuff bit of send data CTx, not being replaced with error data, will be outputted as shown in the lowermost state of the timing chart in FIG. 12.

In other words, the send data control part 4 can prepare, in the data format of send data CTx, the signal Smt that is send message data from the message processing part MP. The send data control part 4 receives stuff_bit instruction information Srb about error insertion during stuff bit mode and, when the preparation processing position of the send data CTx reaches the stuff bit insert position, again inverts the stuff bit and inserts it into the send data CTx, thereby incorporating the error data into the send data CTx.

Thus, the protocol processing part PP has the send data control part 4 that, when the preparation processing position of send data CTx reaches the stuff bit insert position, incorporates error data into the send data CTx by again inverting the stuff bit and inserting into the send data CTx. This permits accurate generation of error data at a stuff bit position in the send data CTx, thereby verifying whether error data is detectable on the error management circuit EC even in loop back mode.

While the invention has been shown and described in detail, the foregoing description is in all aspects illustrative and not restrictive. It is therefore understood that numerous modifications and variations can be devised without departing from the scope of the invention.

What is claimed is:

1. An electric control unit adapted to coupling with a Controller Area Network comprising:

a central processing unit; and a network interface unit comprising a protocol processing unit, a message processing unit, and a register, wherein in a first mode, the network interface unit is to receive a message from the Controller Area Network or is to send a message to the Controller Area Network in response with a control signal from the central processing unit, wherein the protocol processing unit interprets a received message and generates a sending message in accordance with a data set in the register, wherein the message processing unit controls priority of messages, and wherein in a second mode, the protocol processing unit incorporates a first message into the received message or a second message into the sending message in accordance with the data set in the register, and the register includes a first bit field for indicating the first mode or the second mode, a second bit field for specifying to incorporate the first message into the received message or the second message into the sending message.

2. The electric control unit according to claim 1, wherein the first message and the second message include an error data.

3. The electric control unit according to claim 1, wherein the network interface unit further comprises an error management unit, wherein the first bit field indicates the second mode and the second field indicates to incorporate the first message in the received message, and the error management unit checks whether the protocol processing unit detects an error in the first message or not.

* * * * *